(12) United States Patent
Mende et al.

(10) Patent No.: US 6,864,832 B2
(45) Date of Patent: Mar. 8, 2005

(54) METHOD AND DEVICE FOR DETERMINING SEPARATION AND RELATIVE SPEED OF A DISTANT OBJECT

(75) Inventors: Ralph Mende, Braunschweig (DE); Hermann Rohling, Wolfenbuttel (DE); Marc-Michael Meinecke, Hamburg (DE)

(73) Assignee: s.m.s. smart microwave sensors GmbH, Braunschweig (DE)

( * ) Notice: Subject to any disclaimer, the term of this patent is extended or adjusted under 35 U.S.C. 154(b) by 0 days.

(21) Appl. No.: 10/363,156

(22) PCT Filed: Oct. 10, 2001

(86) PCT No.: PCT/DE01/03857
§ 371 (c)(1),
(2), (4) Date: Mar. 4, 2003

(87) PCT Pub. No.: WO02/31529
PCT Pub. Date: Apr. 18, 2002

(65) Prior Publication Data
US 2003/0179128 A1 Sep. 25, 2003

(30) Foreign Application Priority Data
Oct. 10, 2000 (DE) .......................................... 100 50 278

(51) Int. Cl.$^7$ ............................................. G01S 13/42
(52) U.S. Cl. ........................ 342/70; 342/109; 342/130; 342/196
(58) Field of Search ............................. 342/70–72, 104, 342/109–112, 115, 118, 130, 134, 195, 196, 200, 202

(56) References Cited

U.S. PATENT DOCUMENTS

| | | | |
|---|---|---|---|
| 3,750,171 A | | 7/1973 | Faris |
| 4,527,161 A | * | 7/1985 | Wehner ...................... 342/152 |
| 5,349,358 A | | 9/1994 | Canal |
| 5,495,252 A | * | 2/1996 | Adler .......................... 342/127 |
| 5,768,131 A | | 6/1998 | Lissel et al. |
| 5,963,163 A | | 10/1999 | Kemkemian et al. |
| 6,140,954 A | * | 10/2000 | Sugawara et al. ............ 342/70 |
| 6,266,004 B1 | * | 7/2001 | Pannert et al. ................ 342/70 |
| 6,587,074 B1 | * | 7/2003 | Winter et al. ............... 342/130 |

OTHER PUBLICATIONS

Meinecke et al; "Combination of LFMCW and FSK Modulation Principles for Automotive Radar Systesm" German Radar Symposium GRS2000, Berlin, Oct. 11–12, 2000.

* cited by examiner

Primary Examiner—Thomas H. Tarcza
Assistant Examiner—Isam Alsomiri
(74) Attorney, Agent, or Firm—Whitham, Curtis & Christofferson, P.C.

(57) ABSTRACT

The distance and relative speed of an object remote from an observation point determined using a signal form which includes two signals having a predetermined spacing relative to each other. The two signals are transmitted for a certain time interval during which the frequency of the signals is modulated in a stepwise fashion. Additionally, the signal sections of the two signals are transmitted alternately for each step so that there is a predetermined frequency spacing between the signal sections being emitted consecutively.

22 Claims, 2 Drawing Sheets

METHOD AND DEVICE FOR DETERMINING SEPARATION AND RELATIVE SPEED OF A DISTANT OBJECT

BACKGROUND OF THE INVENTION

The invention relates to a method for determining the distance and relative speed of at least one object remote from an observation point with the aid of electromagnetic signals, which are emitted from the observation point and whose frequency is shifted over a modulation range during a measuring interval, and which are in the form of signal sections that are emitted alternately and exhibit a frequency spacing from one another and whose echo signals are detected after reflection at the object, the phase difference of the echo signals originating from the respective signal sections being determined.

The invention further relates to an apparatus for determining the distance and relative speed of at least one object remote from an observation point with the aid of an electromagnetic transmitter for alternately emitting signals whose frequency is shifted over a modulation range during a measuring interval, and which are in the form of signal sections that are emitted alternately and exhibit a frequency spacing from one another, and with the aid of a receiver for receiving the signal sections reflected by the object, the receiver having a device for establishing the phase difference between the echo signals originating from the respective signal sections.

BRIEF SUMMARY OF THE INVENTION

The main field of application of the present invention is its use in the automobile sector where such methods are known for adaptive guidance using 77 GHz radar sets. Safety applications such as the prevention of collisions or driving without a driver necessitate a high reliability and low reaction time which is not realized in the prior guidance systems.

The generic method mentioned at the beginning and the corresponding apparatus are based on the emission of signal sections with one frequency, the signal sections reflected by the objects being regularly mixed with the corresponding transmit frequency such that a measuring signal for the Doppler frequency is produced in the base band in the case of moving objects.

In the case of frequency shift keying (FSK), signal sections with two different frequencies are emitted during a so-called coherent processing interval (CPI). The echo signal can, for example, be converted into the base band with the aid of a homodyn receiver. The frequency spacing between the two frequencies is very small in this case by comparison of the frequencies themselves. The time-discrete receive signal is subjected to Fourier transformation within each CPI and detected with the aid of a threshold value detector. The CFAR method is preferably applied for the detection. The echo signals of the two frequencies lead to an identical Doppler frequency position, since the differential frequency between two frequencies is very small by comparison with the frequencies themselves. Different items of phase information are produced however, from two echo signals because of the different frequencies. The phase difference $\Delta\phi$ forms the basis for determining the distance R. It holds that:

$$R = -\frac{c \cdot \Delta\varphi}{4\Pi \cdot f_{Step}},$$

$f_{Step}$ being the frequency spacing between the two signal sections. This method can be implemented relatively easily by an appropriate modulation of a voltage-controlled oscillator (VCO). However, the method does not permit any resolution of the range of objects of the same or approximately the same relative speed in the measuring direction. This is unsuitable for automobile applications since, for example, fixed targets such as, for example, traffic signs, lamps, trees, lead to multiple echo signals that cannot be separated from one another. If they have approximately the same speed relative to the transmitter, it is also impossible to resolve the distances of moving objects. Such a state, in which such a resolution problem is inherent, cannot be detected for automatic evaluation, and so erroneous evaluations cannot be avoided.

Another known method uses a linear frequency modulation technique (LFM) in which the transmit frequency is modulated with the aid of a triangular waveform over a modulation range $f_{Sweep}$. In the case of a single sweep of the modulation range, the range resolution of $$\Delta R = \frac{c}{2 \cdot f_{Sweep}}$$

leads to an ambiguous measurement for the distance and the relative speed. If the mixed received signal is digitized and subjected to Fourier transformation within a single CPI, a peak at the point $\kappa$ is produced in the Fourier spectrum. The ambiguities for the distance and the speed can be represented by the following equations:

$$\kappa = \frac{v}{\Delta v} - \frac{R}{\Delta R} \Leftrightarrow \frac{v}{\Delta v} = \frac{R}{\Delta R} + \kappa,$$

$\Delta v$ specifying the speed resolution that results from the CPI length $T_{Chirp}$ $$\left(\Delta v = \frac{\lambda}{2 \cdot T_{Chirp}}\right).$$

Because of the ambiguities, a plurality of measurements are executed with different slopes of the frequency variation. However, the measuring time is undesirably lengthened as a result, and this impairs the short reaction time desired for safety applications.

U.S. Pat. No. 5,963,163 discloses a method and an apparatus of the type mentioned at the beginning. In this case, signal sections are emitted that comprise parallel, alternately emitted modulation ramps that are separated from one another by a fixed frequency $\Delta f$, the differential frequency being very small by comparison with the fundamental frequency of the signals. The distance of the object is yielded in this case exclusively as a function of the phase difference between the echo signals of the two ramp signals, which are emitted in the form of the modulation ramps as signal sections. The received signals are immediately separated from one another and processed in different analog channels, one of the signals being delayed in analog fashion by the pulse width of the emitted signals. The evaluation method consists in eliminating the ambiguities, occurring in a ramp measurement (LFM), in the distance/speed plane via the distance estimate by means of the measured phase shift Δφ. This known method is complicated and problematical in terms of measurement. The reconstruction of the measured signals, transmitted in broken signal sections, in the analog channels requires complicated smoothing. Moreover, even small errors in the time control of the scanning (at the end of the ramp sections) generate phase errors that directly effect a measuring error.

The invention is based on the object of permitting the determination of distance and relative speed together with an improved measuring accuracy in conjunction with a short reaction time.

This object is achieved according to the invention with the aid of a method of the type mentioned at the beginning in such a way that the signal sections are emitted shifted in steps over the modulation range by in each case one frequency step, and in that at least one sample is taken for each signal section to determine the phase difference.

An apparatus according to the invention for achieving the object is set up to carry out the method.

The determination according to the invention of distance and relative speed permits unique measurements of distance and speed with surprising ease. According to the invention, the two signal sections with different frequencies are subjected in steps to frequency modulation over the finite modulation range. The received echo signal can be mixed downward in the usual way into the base band and evaluated at the end of each frequency step.

Each of the two signal sequences can be evaluated separately by a Fourier transformation and a threshold value detection. An individual object with a specific distance and a specific speed is detected in the output signal, subjected to Fourier transformation, of the two evaluated spectra in both sequences in conjunction with the same integral index $\kappa=\kappa_A=\kappa_B$. The same ambiguities of distance and speed that were mentioned above occur in both signal sequences. The measured phases $\phi_A$ and $\phi_B$ of the two complex spectral peaks differ from one another and contain the differentiating information on distance and speed that can be used to resolve the ambiguity. The phase difference $\Delta\phi=\phi_B-\phi_A$ can be evaluated for determining distance and determining speed on the basis of the coherent measurement technique in both sequences. The phase difference Δφ can be described analytically by the following equation:

$$\Delta\varphi = \frac{\Pi}{N-1} \cdot \frac{v}{\Delta v} - 4\Pi \cdot R \cdot \frac{f_{Shift}}{c},$$

N being the number of the frequency steps in each transmitted signal sequence A and B of the two different frequencies. In the case of the first calculation, Δφ is ambiguous, but the ambiguities can be resolved by combining the measurement results in accordance with the above equations. The intersection of the two measurement results leads to a unique determination of the distance and the relative speed.

Whereas in the case of conventional frequency shift keying (FSK) the signal sections of the two frequencies are emitted in each case as long as the received echo signals are fully sampled at the desired sampling rate (for example 64 samples), and the samples are fed to the associated evaluation device (for example Fourier transformation), before the sampling of the following signal section of the other frequency is carried out and the samples are supplied to the other evaluation device belonging thereto, the signal sections used according to the invention are substantially shorter. The switchover to the other frequency takes place before all the required samples have been collected for one frequency. In the preferred case, only one sample is detected for each signal section, and so the samples are alternately fed to the evaluation devices of one and the other frequency until the required number of samples has been obtained for the two frequencies in a measuring interval.

Owing to this alternatingly interweaved emission of the component signals, it is possible to implement good range resolutions with a short measuring time, and also to detect dynamic target movements effectively.

The emission according to the invention of signal sections at a constant frequency results in substantial advantages by comparison with the use of modulation ramps as emitted in accordance with U.S. Pat. No. 5,963,163. A stationary phase value can be determined for each frequency step, that is to say for each signal section, while in the case of modulation ramps the phase values vary continuously. It is thereby possible to sample the phase values and to process them in a common analog channel for the received echo signal sections until an analog-to-digital conversion is undertaken for carrying out a preferred Fourier transformation. Following the analog-to-digital conversion, the values are evaluated separately for the various echo signals, preferably subjected to the Fourier transformation, in order to determine the phase difference between the emitted signals by determining the frequency peaks and their phase relationship.

As will be described in more detail below, the method according to the invention leads to an ambiguous dependence both of the measured range and of the measured speed of the phase difference Δφ and the frequency. The uniqueness of the measurement result is achieved by combining the measurement results for the distance and the speed in which the intersection of the ambiguity lines of the two measurements is determined.

It is expedient for the purpose of simplifying the calculation when the spacing between the two frequencies of the signals remains constant over the entire modulation range. A slight variation in the two frequencies, that is to say a different frequency shift for the two frequencies, is acceptable in principle and can be utilized with advantage, if appropriate.

It is further preferred to undertake the shift by one frequency step for each emission of the signal sections of the two frequencies, since only redundant measurements would result in the emission of signal sections with the same frequency.

It is, furthermore, expedient for a simplified evaluation when the frequency step corresponds to double the spacing between the two frequencies.

The method according to the invention is suitable both for continuous emission of the alternating signal sections and for pulsed operation in which a temporal spacing is kept between the emission of a signal section of one frequency and the emission of a signal section of the other frequency. If the aim is for the received signal to be mixed downward after the emission of the signal section, the transmitting oscillator can continue to run at the carrier frequency for this purpose.

The mode of procedure according to the invention can, of course, also execute with the aid of more than two signals whose signal sections are emitted alternately in order to achieve higher measuring accuracies through the evaluation of a plurality of phase differences.

BRIEF DESCRIPTION OF THE DRAWINGS

The aim below is to explain the invention in more detail with the aid of exemplary embodiments illustrated in the drawings, in which.

DETAILED DESCRIPTION OF THE INVENTION

Figure 1:
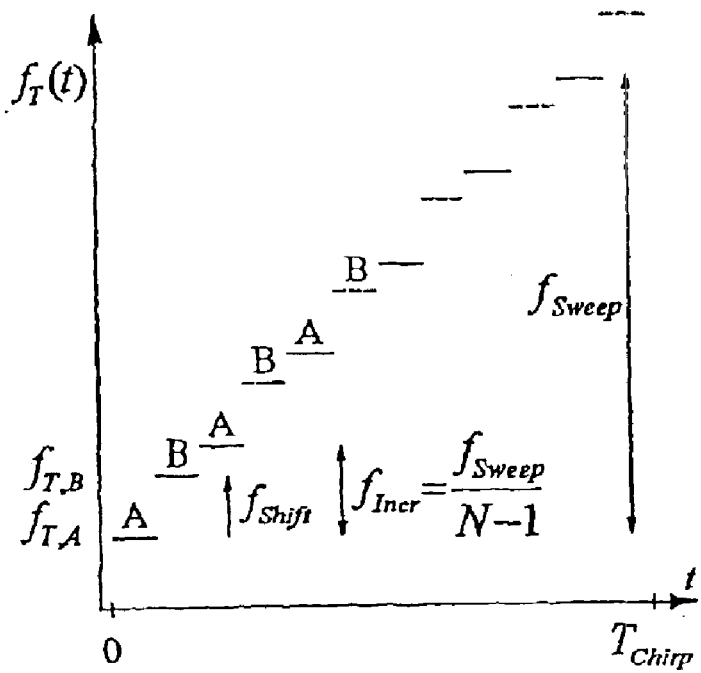
FIG. 1 shows the principle of the waveforms emitted according to the invention.

FIG. 1 shows signal sections A that are offset from one another by a frequency step $f_{Incr}$ in each case from an initial frequency $f_{T,A}$. The signal sections A are emitted alternately with signal sections B that, starting from an initial frequency $f_{T,B}$ are likewise offset in each case by one frequency step in order thus to sweep a modulation range $f_{Sweep}$. The frequency steps $f_{Incr}$ are of the same size over the modulation range $f_{Sweep}$, and so it holds that $$f_{Incr} = \frac{f_{Sweep}}{N-1}.$$

The two signal section sequences A, B thus interwoven with one another are emitted and evaluated separately by Fourier transformation and the threshold value technique after receipt of the echo signals. The following unique measurement results are obtained by the abovementioned combination of the measurement results, taking account of the phase difference $\Delta\phi$:

$$R_o = \frac{c \cdot \Delta R}{\Pi} \cdot \frac{(N-1) \cdot \Delta\varphi - \Pi \cdot \kappa}{c - 4 \cdot (N-1) \cdot f_{Shift} \cdot \Delta R},$$

$$v_o = \frac{(N-1) \cdot \Delta v}{\Pi} \cdot \frac{c \cdot \Delta\varphi - 4\Pi \cdot f_{Shift} \cdot \Delta R \cdot \kappa}{c - 4 \cdot (N-1) \cdot f_{Shift} \cdot \Delta R},$$

Figure 2:
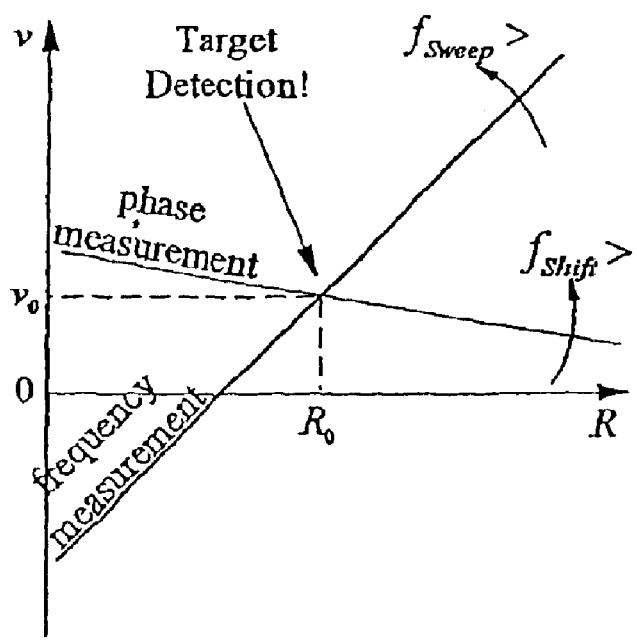
FIG. 2 shows a graphically represented principle for solving the ambiguities of the measurements.
Figure 3:
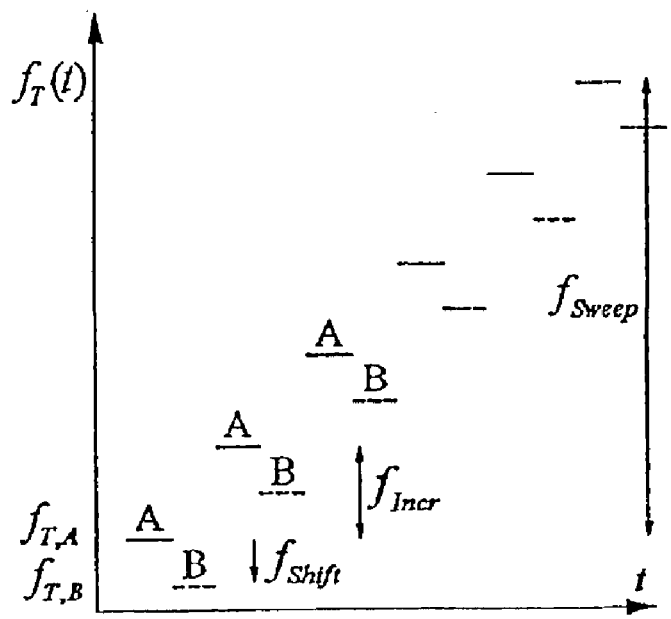
FIG. 3 shows an example of an optimized waveform according to the invention.

FIG. 2 illustrates that the phase measurement and the frequency measurement per, se are ambiguous, but that the combination of the two measurements leads to an interception of the straight lines that permits the desired values for $R_0$ and $v_0$ to be determined.

In an example for automobile applications, the signal bandwidth $f_{Sweep}$=150 MHz, in order to ensure a distance resolution of 1 m. The stepwise frequency modulation is split up into N=256 separate bursts A or B so that the following results:

$$f_{Incr} = \frac{150 \text{ MHz}}{255} = 588 \text{ kHz}.$$

The measuring time within an individual burst A or B is, for example, 5 $\mu$s, the result of this being a chirp duration of the interwoven signals of $T_{Chirp}$=2.56 ms, resulting in a speed resolution $$\Delta v = \frac{C}{2 f_T} \cdot \frac{1}{T_{Chirp}}$$

of 2.7 km/h.

Figure 4:
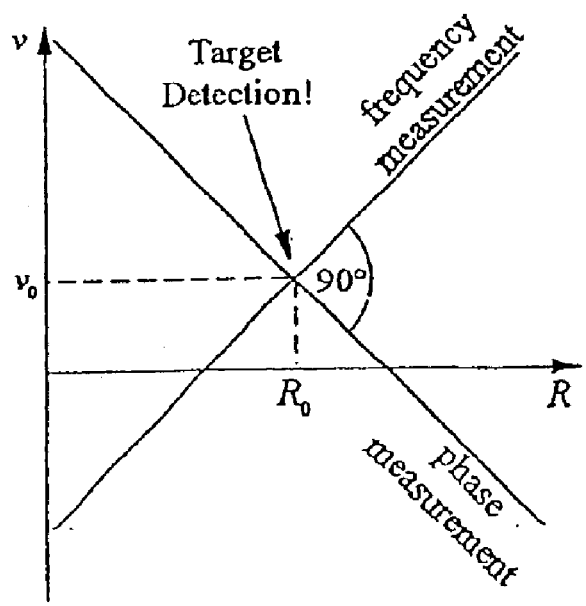
FIG. 4 shows a diagram in accordance with FIG. 2 for an optimized frequency step.

The frequency spacing $f_{Shift}$ is optimized on the basis of a high, accuracy of distance and speed. The highest accuracy is obtained when the intersection of the R straight lines and the v straight lines is formed from two orthogonal lines, as is illustrated in FIG. 4. The frequency spacing between the signal frequencies A and B is $$f_{Shift} = -\frac{1}{2} \cdot f_{Incr},$$

that is to say 294 kHz in the present case, for this optimization. In this special case, the above equations are yielded as $$\frac{R_0}{\Delta R} = \frac{N-1}{2\Pi} \cdot \Delta\varphi - \frac{\kappa}{2},$$

and $$\frac{v_0}{\Delta v} = \frac{N-1}{2\Pi} \cdot \Delta\varphi + \frac{\kappa}{2}.$$

It therefore emerges that the waveform according to the invention can be used in a simple way to determine distance and relative speed during a single chirp, that is to say in the shortest measuring time. The specified optimizations and preferred embodiments lead to, the simplest evaluations and a low outlay on hardware.

What is claimed is:

1. A method for determining the distance and relative speed of at least one object remote from an observation point, comprising the steps of:

emitting two electromagnetic signals from the observation point, said two electromagnetic signals being embedded in a single signal by being emitted alternately in sections, the frequencies in said single signal being constant within any section and, for each of the two electromagnetic signals, being shifted stepwise from section to section by one step for each successive shift over a modulation range during a measuring interval, said two electromagnetic signals having a predetermined frequency spacing from one another;

detecting echo signals after reflection of the emitted signals at the object by sampling at least one sample each of the alternative echo signal sections and feeding them alternately to evaluation devices for evaluating frequency and phase of both signals separately; and evaluating the phase difference of the detected frequencies of the alternative sections in each said echo signal in order to determine distance and relative speed of the object.

2. The method as claimed in claim 1, wherein the echo signals are evaluated by Fourier transformation and by determining the phase difference between the peaks occurring thereby that correspond to the frequency of the echo signals of the signal steps.

3. The method as claimed in claim 1, characterized in that a uniqueness of the measurement of the distance and the speed is created by a combination of the ambiguous measurements for distance, which depend on frequency and phase difference, on the one hand, and speed on the other hand.

4. The method as claimed in claim 1, wherein the samples for the echo signals of the signal sections of the signals shifted in frequency relative to one another are processed in a common analog channel and not separated from one another until after an analog-to-digital conversion.

5. The method as claimed in claim 1, wherein the spacing between two frequencies remains the same over the entire modulation range.

6. The method as claimed in claim 1, wherein the shift is undertaken by one frequency step for each emission of the signal sections of the two frequencies.

7. The method as claimed in claim 1, wherein the frequency step corresponds to double the spacing between the two frequencies.

8. The method as claimed in claim 1, wherein the alternating signal sections are emitted and received continuously.

9. The method as claimed in claim 1, further comprising the step of keeping a temporal spacing between the emission of a signal section of one frequency and the emission of a signal section of the other frequency.

10. The method as claimed in claim 1, characterized in that use is made of more than two signals that are emitted with alternating signal sections and mutually differing frequency.

11. The method according to claim 1 wherein the number of signal sections per modulation range is determined in accordance with a selected sampling rate and the sampling rate is selected so that frequency and phase of both echo signals can be evaluated separately from the echo signal sections.

12. An apparatus for determining the distance and relative speed of at least one object remote from the apparatus, comprising:

an electromagnetic transmitter for two electromagnetic signals, said two signals being embedded in a single signal by being emitted alternately in sections, the frequencies in said single signal being constant within any section and, for each of the two electromagnetic signals, being shifted stepwise from section to section by one step for each successive shift over a modulation range during a measuring interval, said two electromagnetic signals having a predetermined frequency spacing from one another;

detector for echo signals reflected from the object, sampling at least one sample each of the alternative echo signal sections and feeding them alternately to evaluation devices, the evaluation devices evaluating frequency and phase of both signals separately and evaluating the phase difference of the detected frequencies of both echo signals for determining distance and relative speed of the object.

13. The apparatus as claimed in claim 12, wherein the receiver has a Fourier transformation stage and a downstream determining device for determining the phase difference between the peaks that are formed in the Fourier transformation stage and correspond to the frequency of the echo signals of the signal sections.

14. The apparatus as claimed in claim 12, characterized in that a uniqueness of the measurement of the distance and the speed is created in the receiver by a combination of the ambiguous measurements for distance, which depend on frequency and phase difference, on the one hand, and speed on the other hand.

15. The apparatus as claimed in claim 12, further comprising a common analog channel for processing the samples for the signal sections of the signals shifted in frequency relative to one another, an analog-to-digital converter following thereupon, and means for following separate digital evaluation channels.

16. The apparatus as claimed in claim 12, wherein the spacing between the two frequencies remains the same over the entire modulation range.

17. The apparatus as claimed in claim 12, wherein the shift is undertaken by one frequency step for each emission of the signal sections of the two frequencies.

18. The apparatus as claimed in claim 12, wherein the frequency step corresponds to double the spacing between the two frequencies.

19. The apparatus as claimed in claim 12, wherein the alternating signal sections are emitted and received continuously.

20. The apparatus as claimed in claim 12, characterized in that a temporal spacing is kept between the emission of a signal section of one frequency and the emission of a signal section of the other frequency.

21. The device as claimed in claim 12, further comprising an electromagnetic transmitter for emitting more than two signals in the form of alternating signal sections with mutually differing frequencies.

22. The apparatus according to claim 12 wherein the electromagnetic transmitter emits signal sections of both signals the number of which per modulation range being determined in accordance with a selected sampling rate, and the detector samples the echo signal sections with a sampling rate enabling the evaluation device to evaluate frequency and phase of both signals separately.

* * * * *